(12) United States Patent
Stander et al.

(10) Patent No.: US 8,897,983 B2
(45) Date of Patent: Nov. 25, 2014

(54) SYSTEM AND METHOD FOR USING VEHICLE PARASITIC LOADS TO AID WITH VEHICLE SPEED RETARDATION

(75) Inventors: Francois Stander, Dubuque, IA (US); David F. Rindfleisch, Dubuque, IA (US); David R. Didelot, Asbury, IA (US)

(73) Assignee: Deere & Company, Moline, IL (US)

( * ) Notice: Subject to any disclaimer, the term of this patent is extended or adjusted under 35 U.S.C. 154(b) by 676 days.

(21) Appl. No.: 13/027,691

(22) Filed: Feb. 15, 2011

(65) Prior Publication Data

US 2012/0209486 A1 Aug. 16, 2012

(51) Int. Cl.
| | |
|---|---|
| *B60T 8/17* | (2006.01) |
| *B60T 10/00* | (2006.01) |
| *B60T 13/58* | (2006.01) |
| *B60W 10/06* | (2006.01) |
| *B60W 10/11* | (2012.01) |
| *B60W 10/18* | (2012.01) |
| *B60W 10/30* | (2006.01) |
| *B60W 30/18* | (2012.01) |
| *B60W 30/184* | (2012.01) |

(52) U.S. Cl.
CPC ............. *B60T 10/00* (2013.01); *B60T 13/585* (2013.01); *B60W 10/06* (2013.01); *B60W 10/11* (2013.01); *B60W 10/18* (2013.01); *B60W 10/30* (2013.01); *B60W 30/18109* (2013.01); *B60W 30/18136* (2013.01); *B60W 30/1843* (2013.01)
USPC ........................................................ 701/70

(58) Field of Classification Search
USPC ........................................................ 701/70
See application file for complete search history.

(56) References Cited

U.S. PATENT DOCUMENTS

| | | | |
|---|---|---|---|
| 7,849,688 B2 | 12/2010 | Dvorak et al. | |
| 2003/0220729 A1 | 11/2003 | Doddek et al. | |
| 2008/0086254 A1* | 4/2008 | Anderson et al. | 701/93 |
| 2009/0086254 A1 | 4/2009 | Duong | |
| 2010/0024391 A1* | 2/2010 | Frazier et al. | 60/274 |
| 2010/0137102 A1* | 6/2010 | Sopko et al. | 477/118 |
| 2011/0125376 A1* | 5/2011 | Chappell et al. | 701/65 |

FOREIGN PATENT DOCUMENTS

| | | | |
|---|---|---|---|
| EP | 0937885 | 8/1999 | |
| EP | 0937885 A2 * | 8/1999 | ............ F02D 41/40 |

OTHER PUBLICATIONS

EP 0937885 A2 FOR.*
Aug. 25, 1999, EP 0937885 A2 FOR.*
Swedish Patent and Registration Office, Pat. Application No. 125-125-0, Office Action, Nov. 9, 2012.

* cited by examiner

*Primary Examiner* — Fadey Jabr
*Assistant Examiner* — Yazan A Soofi
(74) *Attorney, Agent, or Firm* — Taft Stettinius & Hollister LLP; Stephen F. Rost (57) ABSTRACT

A system and method for providing additional speed retardation capacity is disclosed that utilizes parasitic loads of the vehicle. A vehicle is disclosed that includes a vehicle control system for sensing overspeed conditions, a powertrain, and a parasitic load. When an overspeed condition is detected, the parasitic load that is normally deactivated to improve efficiency is activated to remove power from the powertrain. Temperature sensors can monitor a load temperature and the parasitic loads can be controlled based on the temperature readings. A method is disclosed that includes detecting overspeed conditions, activating parasitic loads to absorb power when an overspeed condition is detected, and deactivating the loads when the overspeed condition ceases. The parasitic loads can be controlled separately or together. The method can include cumulative actions based on greater overspeed conditions.

20 Claims, 6 Drawing Sheets

SYSTEM AND METHOD FOR USING VEHICLE PARASITIC LOADS TO AID WITH VEHICLE SPEED RETARDATION

FIELD OF THE INVENTION

The present invention generally relates to the field of vehicle speed retardation and more specifically to vehicle speed retardation using parasitic loads.

BACKGROUND OF THE INVENTION

When a vehicle, for example a dump truck, operates on a site with long, high speed downhills, it can get into situations where the vehicle powertrain enters an overspeed condition. An overspeed condition can also occur on a very steep downhill, where the operator does not have full control over the vehicle speed. The manufacturers of these vehicles apply various methods to try and avoid these overspeed conditions from occurring. The powertrain usually refers to the engine and transmission. The drivetrain usually refers to the group of components other than the powertrain that deliver engine power to the road surface, which can include for example the driveshafts, differentials, final drive and wheels. In this disclosure, powertrain will be used to refer to both the vehicle powertrain and the vehicle drivetrain.

The methods that are most commonly utilized to avoid these overspeed conditions are to remove throttle control from the operator, and apply an engine brake (engine valve brake, exhaust brake or both) or a transmission retarder in an effort to slow the vehicle down. In vehicles that do not have transmission retarders, the manufacturer might utilize the vehicle's service brakes in an attempt to slow the vehicle down.

These techniques may be successful in many cases, but in instances where there are extended high speed downhill operations, these measures may not be sufficient to cope with the high energy demands that are required for the continued retardation of the vehicle. It would be desirable to have additional retardation capacity available for use in cases where this capacity is beneficial or necessary to avoid or regain control from an overspeed condition.

SUMMARY

A system and method for providing additional retardation capacity is disclosed that utilizes parasitic losses of the vehicle to add additional retardation capacity. The system and method disclosed can also be applied in instances where a vehicle rapidly increases speed on a steep downhill. A parasitic load is any undesirable energy loss in the powertrain. These losses usually rob the vehicle of energy that would normally be used to propel the vehicle forwards or backwards. This energy is usually lost in the form of heat or noise. Examples of such parasitic losses can include (but are not limited to); gear meshing losses, gear losses because of the gears turning through oil, fan losses, friction losses in bearings, hydraulic system inefficiencies, tire rolling resistance, etc.

A vehicle is disclosed that includes a vehicle control unit for sensing an overspeed condition; a powertrain; and a parasitic load coupled to the vehicle control unit that draws power from the powertrain. When the vehicle control unit senses an overspeed condition, the vehicle control unit activates the parasitic load to remove power from the powertrain. The parasitic load can be a cooling system, a power loss associated with a hydraulic system, a drive axle, or other load that removes power from the powertrain. The cooling system can include a fan motor powered by the powertrain and a fan powered by the fan motor. The cooling system can be an engine cooling system, or a secondary cooling system. The cooling system can also be a hydraulic cooler or an axle cooler.

The vehicle can also include a temperature sensor coupled to the vehicle control unit that monitors a load temperature associated with the parasitic load. When the vehicle control unit activates the parasitic load due to an overspeed condition, the vehicle control unit monitors the load temperature using the temperature sensor and deactivates the parasitic load when the monitored load temperature exceeds an overheat threshold. The vehicle control unit can also deactivate the parasitic load during the overspeed condition when the monitored load temperature exceeds an overheat threshold. The vehicle control unit can also reactivate the parasitic load when the monitored load temperature drops below a load activation temperature threshold.

A method is disclosed for using vehicle parasitic loads to aid with speed retardation of a vehicle. The method includes monitoring a vehicle to detect overspeed conditions; activating a parasitic load to absorb power from the powertrain when an overspeed condition is detected; and deactivating the parasitic load when the overspeed condition is no longer detected. The method can also include monitoring a load temperature associated with the parasitic load and deactivating or reactivating the parasitic load based on the load temperature. The parasitic load can be deactivated when the load temperatures exceeds an overheat temperature threshold during the overspeed condition, and then reactivated when the load temperatures drops below a load activation temperature threshold during the overspeed condition.

A plurality of parasitic loads can be activated when an overspeed condition is detected, and the plurality of parasitic loads can be deactivated when the overspeed condition is no longer detected. A load temperature can be associated with each separate load of the plurality of parasitic loads. Each load can be activated and deactivated based on its associated load temperature. Each load can be deactivated when its associated load temperature exceeds an overheat temperature threshold during the overspeed condition, and then reactivated when its associated load temperature drops below a load activation temperature threshold during the overspeed condition.

A method is disclosed for using vehicle parasitic loads to aid with speed retardation of a vehicle, where the method includes monitoring a vehicle to detect overspeed conditions, and taking additional actions as the overspeed condition progresses. The method includes taking over of throttle control from a vehicle operator by a vehicle control unit when the vehicle speed exceeds a first overspeed threshold, and restoring throttle control to the vehicle operator by the vehicle control unit when the vehicle speed drops below the first overspeed threshold. The method includes activating at least one of transmission retardation, engine brake and service brakes by the vehicle control unit when the vehicle speed exceeds a second overspeed threshold, and deactivating any activated ones of the transmission retardation, engine brake and service brakes by the vehicle control unit when the vehicle speed drops below the second overspeed threshold. The method also includes activating a parasitic load by the vehicle control unit to absorb power from the powertrain when the vehicle speed exceeds a third overspeed threshold; and deactivating the parasitic load when the vehicle speed drops below the third overspeed threshold. The second overspeed threshold is greater than the first overspeed threshold;

and the third overspeed threshold is greater than the second overspeed threshold. A plurality of parasitic loads can be activated when the vehicle speed exceeds the third overspeed threshold, and the plurality of parasitic loads are deactivated when the vehicle speed no longer exceeds the third overspeed threshold: This method can also include monitoring a load temperature associated with the parasitic load and activating or deactivating the parasitic load based on the load temperatures.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Vehicle manufacturers and component developers have spent a considerable amount of time and money to develop components that help reduce the parasitic draws on a vehicle's powertrain. All of the power that a vehicle's non-powertrain systems absorb from the powertrain is power that the powertrain is not able to utilize for vehicle motion. Examples of systems that have been developed to reduce parasitic loads include, but are not limited to: load sensing hydraulic systems that only produce flow and pressure when it is needed, proportional fan drive systems that only turn the fan when there is a cooling requirement, disconnecting some drive axles when they are not needed, reducing the oil level in axles and gearboxes to reduce the losses generated by gears turning in oil, and numerous others.

For example, a vehicle's fan drive systems can act as a parasitic load. When operating under load, the vehicle's various fan drives have the capacity to rob the vehicle of a substantial amount of power that can be used to propel the vehicle. The reverse is also true. If a fan drive is activated when the vehicle's mass is propelling it down an incline, energy from the vehicle's powertrain is transferred to the vehicle's fan drive which acts as a retarding force on the vehicle's motion.

A vehicle's cooling loads can be another example of parasitic loads that could be activated to draw power from the vehicle's powertrain. Since the cooling loads may not be operational (or fully operational) when the vehicle is in motion, the cooling capacity that can be provided by the cooling loads is wasted. In an overspeed condition, one or more cooling loads could be activated to draw energy from the powertrain and to retard the speed of the vehicle. In addition, the cooling capacity provided by the cooling loads can be used to alleviate overheating of other vehicle components. Examples of these types of cooling loads can include hydraulic coolers or axle coolers.

Figure 1:
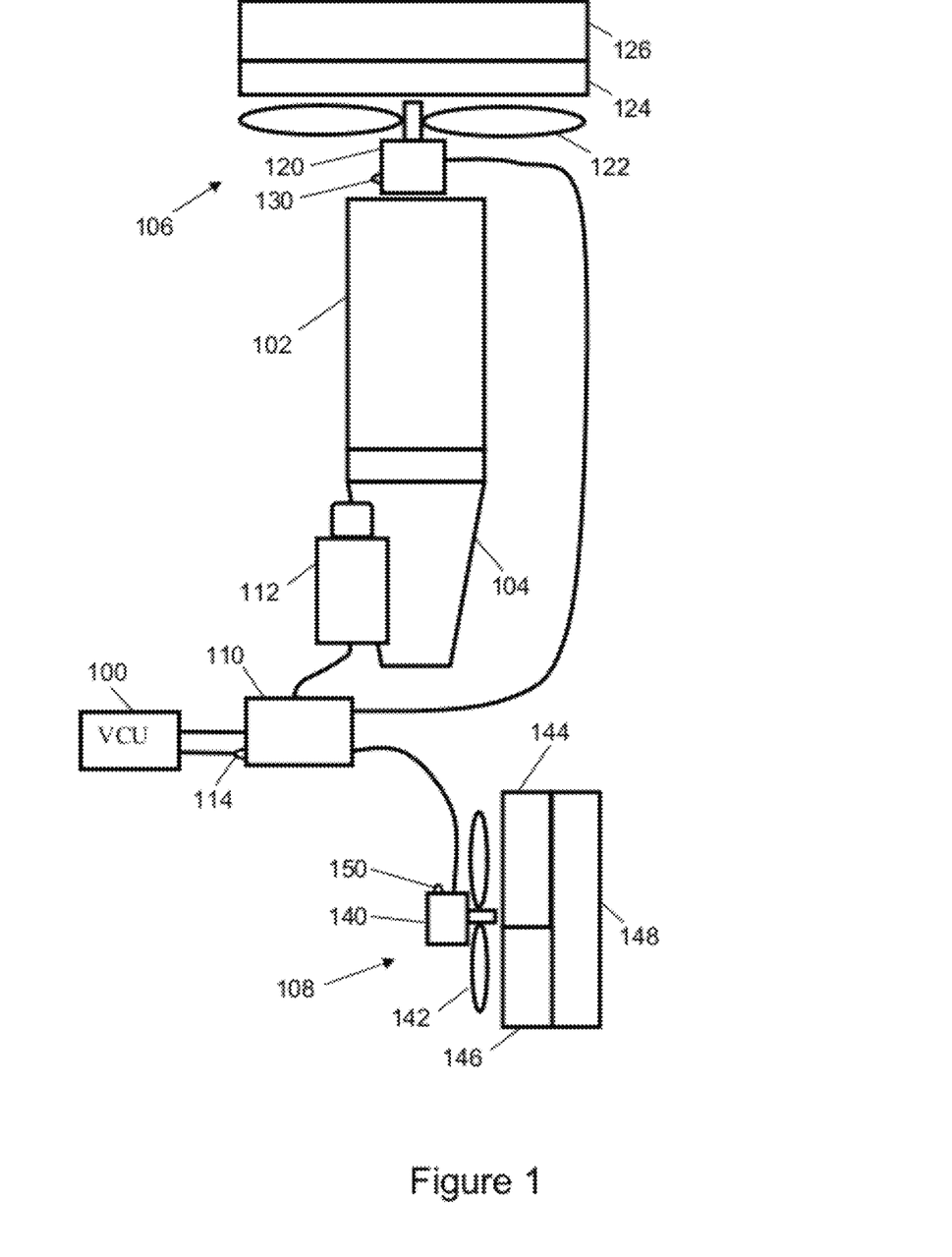
FIG. 1 shows a portion of an exemplary vehicle layout including a vehicle control unit (VCU), a powertrain, an engine cooling system and a secondary cooling system.

FIG. 1 shows a portion of an exemplary vehicle layout including a vehicle control unit (VCU) 100, an engine 102, a transmission 104, an engine cooling system 106, a secondary cooling system 108, a hydraulic manifold 110, and a pressure and flow compensated pump 112. The engine 102 and the transmission 104 are part of the vehicle powertrain. The engine cooling system 106 includes an engine fan motor 120 and a radiator fan 122 that blows cooling air across a charge air cooler 124 and a radiator 126. The secondary cooling system 108 includes a secondary fan motor 140 and a secondary fan 142 that blows cooling air across brakes 144, brake hydraulics 146 and/or a transmission cooler 148.

In this embodiment, the VCU 100 is electrically coupled to the hydraulic manifold 110 which is hydraulically coupled to the pump 112, the engine fan motor 120 and the secondary fan motor 140. The VCU 100 is also coupled to a manifold temperature sensor 114, an engine fan temperature sensor 130 and a secondary fan temperature sensor 150. The manifold temperature sensor 114 monitors the temperature of the hydraulic fluid at the hydraulic manifold 110, the engine fan temperature sensor 130 monitors the temperature of the engine cooling system 106, and the secondary fan temperature sensor 150 monitors the temperature of the secondary cooling system 108. A separate connection is shown between the manifold temperature sensor 114 and the VCU 100. For clarity, a separate connection is not shown between the engine fan temperature sensor 130 or the secondary fan temperature sensor 150 and the VCU 100. There can be more or less temperature sensors used in the system as desired. The temperature sensors can be placed on alternative or additional components to determine when to activate and deactivate the engine cooling system 106 and the secondary cooling system 108. The temperature sensors can be directly connected to the VCU 100 or another controller, for example a transmission control unit or engine control unit. The temperature sensors can also be indirectly coupled to a control unit, for example through the hydraulic manifold 110.

In a downhill braking situation, the secondary cooling system 108 is likely to be running to cool the transmission and/or brakes but, since the engine is not under load and therefore not generating much heat when travelling down a hill, the engine cooling system 106 may not be operating, or may be operating in a low power mode. If the VCU 100 activates the engine fan motor 120 and powers the engine fan 122 to turn at its maximum speed before a vehicle overspeed condition is achieved, the additional power used to turn the engine fan motor 120 and engine fan 122 is drawn from the powertrain which can aid in retarding the vehicle's speed. The VCU 100 can also cause the secondary cooling system 108 to run at a higher speed to draw additional power from the powertrain. The secondary cooling system 108 can help alleviate any additional heat load this action might generate in the hydraulics 146 or other components. The temperature sensors 114, 130, 150 can be used to monitor the temperatures of the load components, and the VCU 100 can also activate and deactivate the parasitic loads based on these temperature readings.

Figure 2:
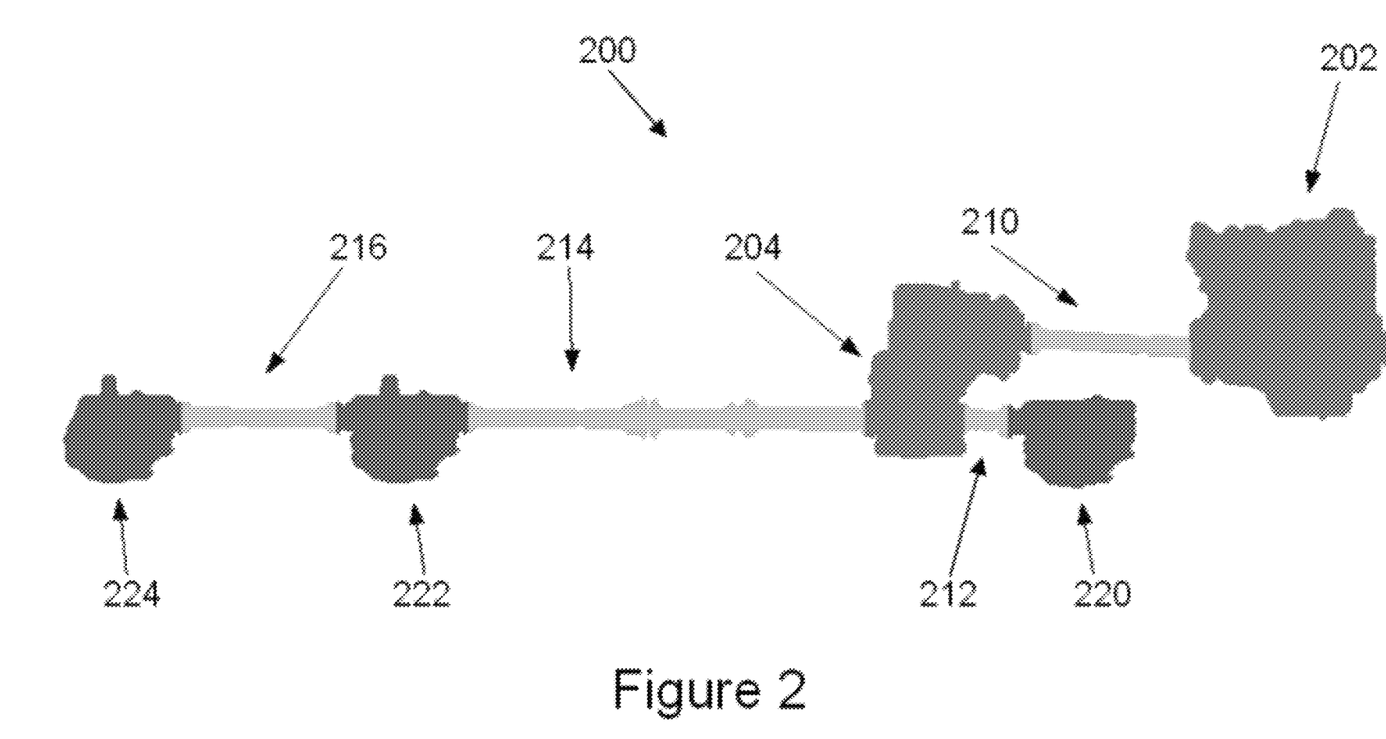
FIG. 2 shows an exemplary embodiment of a vehicle powertrain and drivetrain.

FIG. 2 shows an exemplary embodiment of a vehicle powertrain 200 which includes an engine 202, a countershaft transmission 204, and a drivetrain. The engine 202 is coupled to the countershaft transmission 204 through an upper power shaft 210. The drivetrain includes multiple axles 220, 222, 224 coupled to the transmission 204 through multiple drive shafts 212, 214, 216. The transmission 204 is coupled to the front axle 220 through the front drive shaft 212, coupled to the mid axle 222 through the mid drive shaft 214 and coupled to the rear axle 224 through the rear drive shaft 216. The mid axle 222 includes a through drive clutch coupling the rear axle 224 to the transmission 204. In this embodiment, the engine 202 and countershaft transmission 204 transfer power through the drive shafts 212, 214 and 216 to each of the three axles 220, 224 and 226.

Under normal operating conditions, a vehicle with an exemplary powertrain like that shown in FIG. 2, may disengage the through clutch of the mid axle 222 that couples the rear axle 224 to the powertrain. Disengaging the through clutch reduces the parasitic losses through the rear axle 222. In an overspeed condition, the vehicle control unit could reengage the through clutch or otherwise reengage a drive axle to increase the parasitic losses from the powertrain. If the vehicle control unit reconnects one or more drive axles before or during a vehicle overspeed condition, the additional power used by the reconnected drive axle(s) is a parasitic load on the powertrain which can aid in retarding the vehicle's speed.

One or more of the axles shown in FIG. 2 can include an axle cooling system that can also be used to draw power from the powertrain in an overspeed condition to aid with vehicle speed retardation. The axle cooling system can have multiple hydraulic pressure settings, for example, differential-lock mode (high parasitic load) and non-activation mode. If the vehicle control unit activates the differential-lock mode of an axle cooling system before or during a vehicle overspeed condition, the additional power used by the axle cooling system is drawn from the powertrain which can aid in retarding the vehicle's speed.

Figure 3:
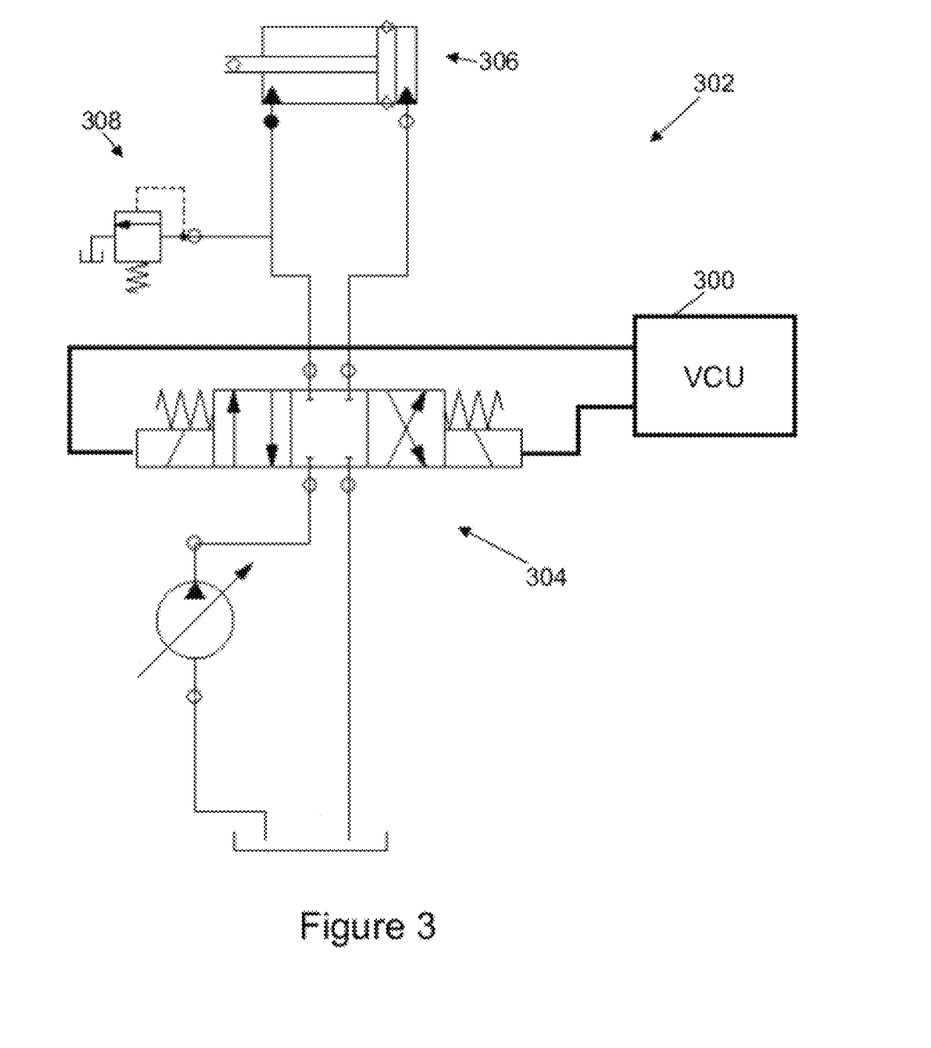
FIG. 3 shows a simplified representation of a vehicle control unit (VCU) coupled to a hydraulic circuit positioned to reduce flow and pressure, thereby minimizing the parasitic losses.
Figure 4:
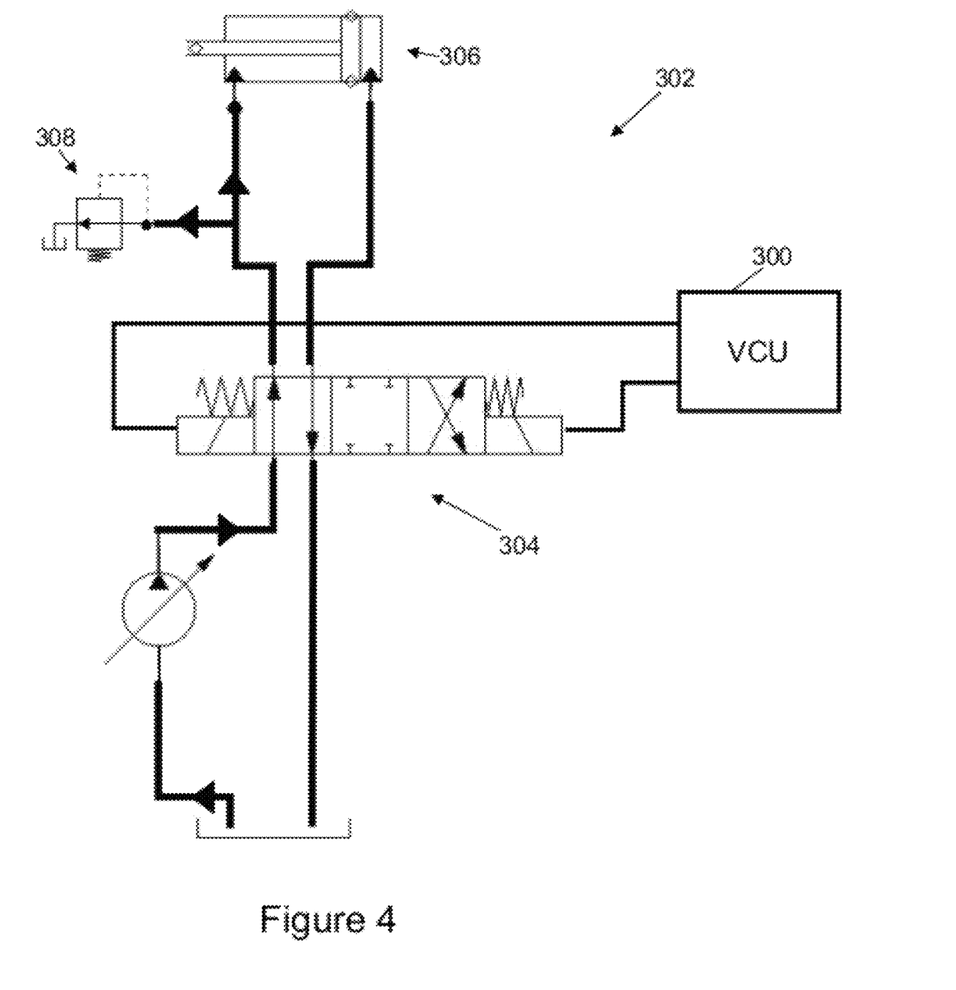
FIG. 4 shows the VCU and hydraulic circuit of FIG. 3 with the hydraulic circuit positioned to increase flow and pressure, thereby increasing the parasitic losses.

FIGS. 3 and 4 show an example of a vehicle control unit activating a hydraulic pump to cause fluid flow over a relief valve which causes a parasitic load to aid with vehicle speed retardation. FIGS. 3 and 4 show a simplified representation of a vehicle control unit (VCU) 300 coupled to a hydraulic circuit 302 that controls the movement of a cylinder 306. The hydraulic circuit 302 includes the cylinder 306, a spool 304 and a relief valve 308. In FIG. 3, the spool 304 is positioned to reduce flow and pressure, thereby minimizing the parasitic losses on the powertrain due to the hydraulic circuit 302. FIG. 4 shows the same hydraulic circuit 302 except that the spool 304 is shuttled to a position that forces the cylinder 306 against its end stop, thereby increasing the pressure in the hydraulic circuit 302 and forcing fluid flow over the relief valve 308, thereby increasing the parasitic losses on the powertrain. If the vehicle control unit 300 activates the hydraulic pump 302 as shown in FIG. 4 before or during a vehicle overspeed condition, the additional power used for the high pressure and high flow caused by the hydraulic pump 302 is drawn from the powertrain which can aid in retarding the vehicle's speed. In this case almost all of the energy will be absorbed by the hydraulic fluid, and this energy can be dissipated through a hydraulic cooler.

Some of the parasitic loads activated to draw power from the powertrain may generate heat. The vehicle control unit can also be coupled to one or more temperature sensors that monitor the temperature(s) of the affected component(s), such as temperature sensors 114, 130, 150 of FIG. 1. The vehicle control system can include the capability to switch off one or more parasitic load(s) when a particular temperature sensor indicates a temperature at or above an overheat threshold. The vehicle control system can also include the capability to reactivate the parasitic load(s) when the temperature sensor indicates the temperature has dropped below a lower load activation temperature threshold that is deemed safe for re-activation of the parasitic load.

Figure 5:
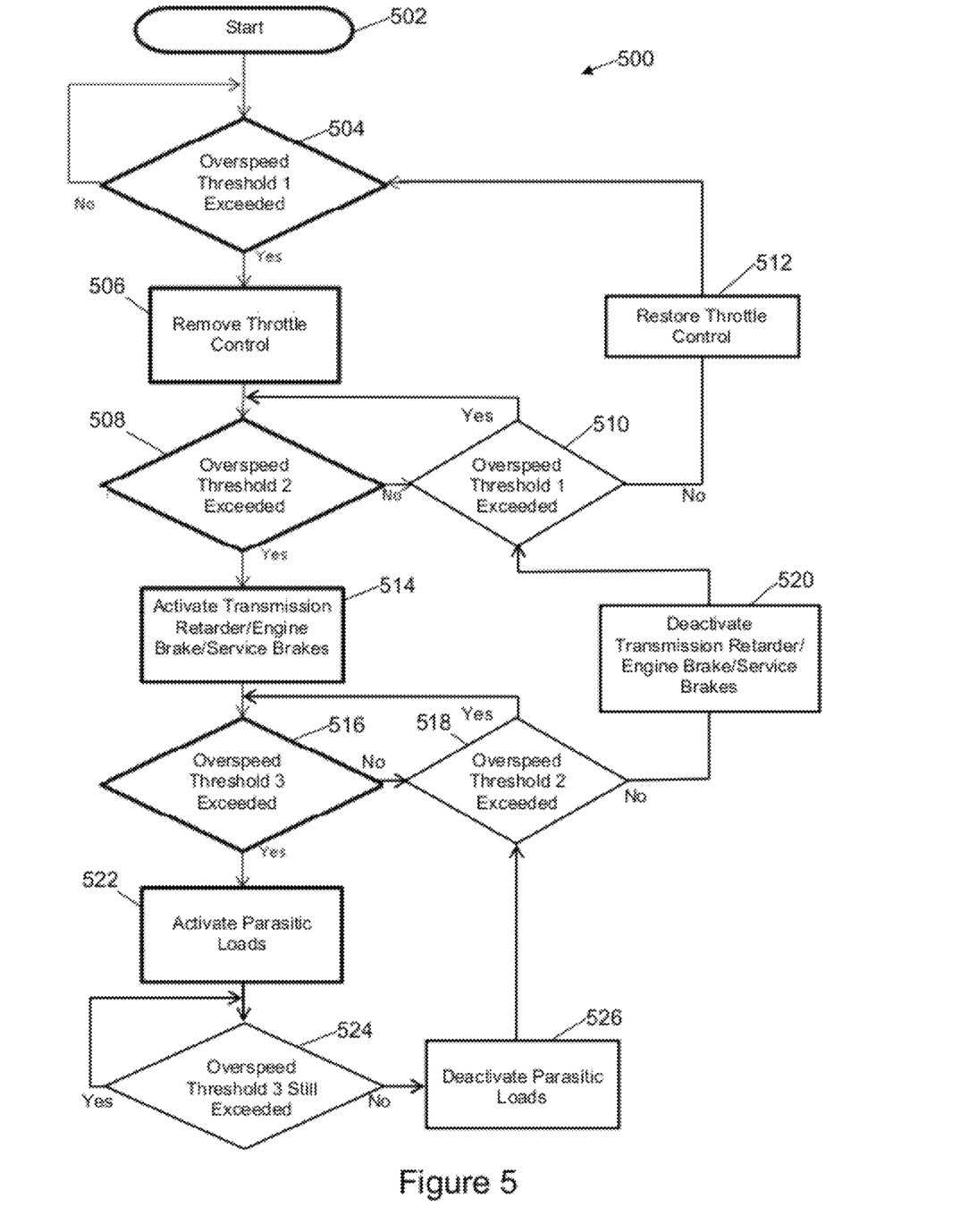
FIG. 5 illustrates an exemplary embodiment of a control method for a vehicle control system that includes controlling parasitic loads to avoid or regain control from an overspeed condition.

FIG. 5 shows an exemplary embodiment of a control method 500 that can be used by the vehicle control system for controlling parasitic loads to retard vehicle speed and avoid or regain control of an overspeed condition. The method 500 starts at block 502 and proceeds to block 504 where the system checks whether a first overspeed threshold has been exceeded. If the first overspeed threshold has not been exceeded then the system remains at block 504 and continues to check whether the first overspeed threshold has been exceeded. If the first overspeed threshold is exceeded then, at block 506, throttle control is removed from the vehicle operator and taken over by the vehicle control system. From block 506, control passes to block 508.

At block 508, the system checks whether a second overspeed threshold has been exceeded, the second overspeed threshold being greater than the first overspeed threshold. If the second overspeed threshold has not been exceeded then, at block 510, the system checks whether the first overspeed threshold is still exceeded. If the second overspeed threshold is exceeded then, at block 514, the vehicle control system activates a transmission retarder, engine brakes and/or service brakes. From block 514 control passes to block 516.

At block 510, if the first overspeed threshold is still exceeded then control passes back to block 508 to check whether the second overspeed threshold is exceeded. If the first overspeed threshold is no longer exceeded then control passes to block 512 where the system restores throttle control to the vehicle operator. From block 512, control passes back to block 504.

At block 516, the system checks whether a third overspeed threshold has been exceeded, the third overspeed threshold being greater than the second overspeed threshold. If the third overspeed threshold has not been exceeded then, at block 518, the system checks whether the second overspeed threshold is still exceeded. If the third overspeed threshold is exceeded then, at block 522, the vehicle control system activates one or more parasitic loads to take additional power from the powertrain. From block 522 control passes to block 524.

At block 518, if the second overspeed threshold is still exceeded then control passes back to block 516 to check whether the third overspeed threshold is exceeded. If the second overspeed threshold is no longer exceeded then control passes to block 520 where the vehicle control system deactivates the transmission retarder, engine brakes and/or service brakes. From block 520, control passes back to block 510.

At block 524 the system checks whether the third overspeed threshold is still exceeded. If the third overspeed threshold is still exceeded then the system remains at block 524 and continues to check whether the third overspeed threshold is still exceeded. If the third overspeed threshold is no longer exceeded then, at block 526, the vehicle control system deactivates the one or more parasitic loads. From block 526, control passes back to block 518.

The control system illustrated in FIG. 5 utilizes three progressively higher overspeed thresholds and takes additional actions to end the overspeed condition. Alternative control systems could have more or less thresholds and could have different actions prior to or after activating the parasitic loads. Alternative control systems could also activate parasitic loads one at a time or several at a time based on additional overspeed thresholds or time exceeding a particular overspeed threshold. Those of skill in the art will recognize that a control system can have numerous other variations with different thresholds, speed retarding actions and timers.

Figure 6:
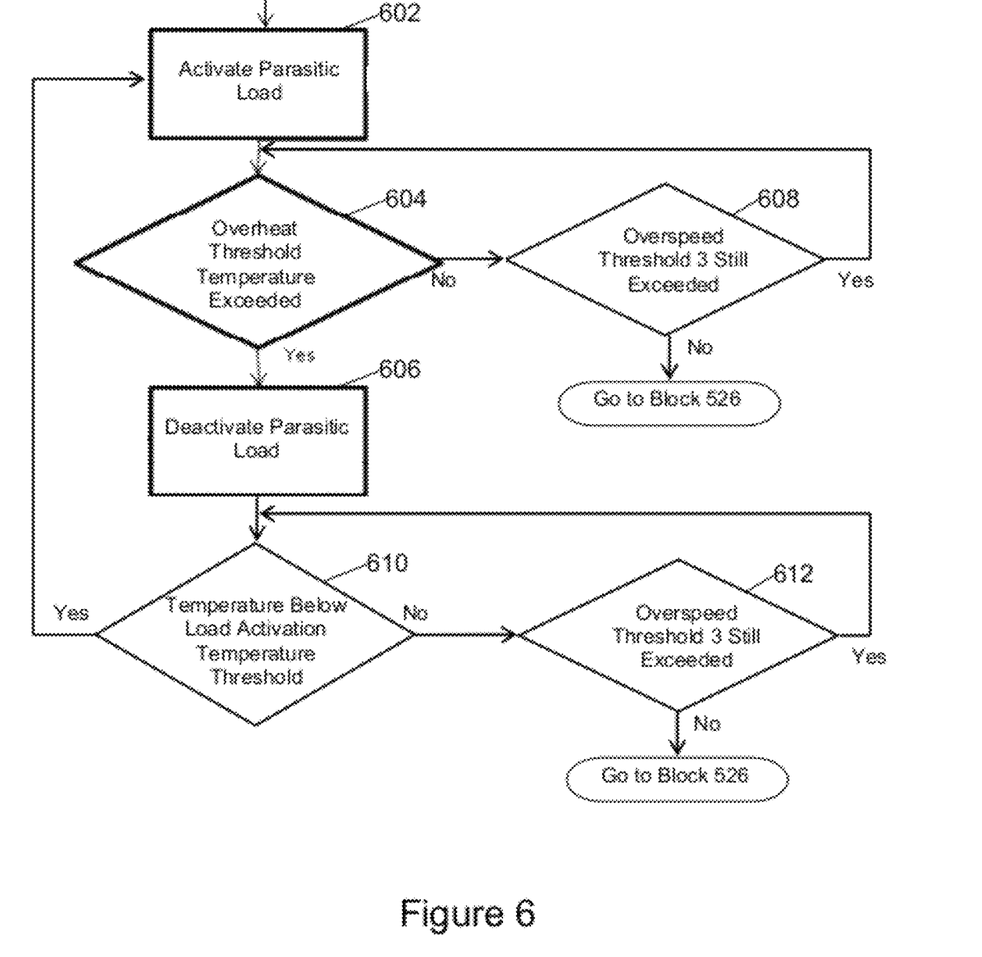
FIG. 6 illustrates an exemplary embodiment of a variation of the control system shown in FIG. 5 that also activates and deactivates parasitic loads based on overheating conditions.

FIG. 6 illustrates an exemplary embodiment of a variation of the control system shown in FIG. 5 that also checks for overheating conditions that could be caused by the parasitic loads. In this variation, the blocks of FIG. 6 replace blocks 522 and 524 of FIG. 5. At block 516 of FIG. 5, if the third overspeed threshold is exceeded then one or more parasitic loads are activated and control passes to the routine of FIG. 6.

At block 602 a parasitic load is activated, and then at block 604 the control system checks whether a load temperature associated with the parasitic load exceeds an overheat threshold temperature associated with the parasitic load. If the load temperature exceeds the overheat threshold temperature then control passes to block 606 where the parasitic load is deactivated, and then control passes to block 610. If the load temperature does not exceed the overheat threshold temperature then control passes to block 608 to check whether the third overspeed threshold is still exceeded.

At block 608, if the third overspeed threshold is still exceeded then the system returns to block 604 to check the overheat threshold. If the third overspeed threshold is no longer exceeded then control passes to block 526 of FIG. 5 where the vehicle control system deactivates the one or more parasitic loads, and control continues as described above with regard to FIG. 5.

At block 610 the control system checks whether the load temperature has fallen below a load activation threshold temperature associated with the parasitic load. If the load temperature has fallen below the load activation threshold temperature, then control passes to block 602 where the parasitic load is reactivated. If the load temperature has not fallen below the load activation threshold temperature, then control passes to block 612 to check whether the third overspeed threshold is still exceeded.

At block 612, if the third overspeed threshold is still exceeded, then the system returns to block 610 to check the load activation threshold. If the third overspeed threshold is no longer exceeded then control passes to block 526 of FIG. 5 where the vehicle control system deactivates the one or more parasitic loads, and control continues as described above with regard to FIG. 5.

The routine shown in FIG. 6 can be implemented for one or more parasitic loads together where all of the parasitic loads are activated at block 602 and all of the parasitic loads are deactivated at block 606 based on one or more load temperatures. Alternatively, the routine shown in FIG. 6 can be implemented for each of the parasitic loads separately where each parasitic load has an associated overheat threshold and activation threshold. In this latter case, only the load with an associated load temperature exceeding the overheat threshold is deactivated at block 606 and the other loads remain active; and only the formerly overheated load with the associated load temperature going below the activation threshold is reactivated at block 602. In this latter case all of the parasitic loads are activated before entering the routine of FIG. 6. In yet another alternative embodiment, the loads can be grouped into sets of loads with associated overheat thresholds and activation thresholds to deactivate and reactivate each set of loads. Those of skill in the art will recognize additional contemplated variations for the exemplary control systems illustrated of FIGS. 5 and 6.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A vehicle comprising:
a vehicle control unit for sensing a plurality of overspeed conditions;
a powertrain;
at least one of a transmission retarder, an engine brake and service brakes coupled to the vehicle control unit for slowing down the vehicle;
a parasitic load coupled to the vehicle control unit that draws power from the powertrain;
wherein when the vehicle control unit senses a first overspeed condition, the vehicle control unit takes over throttle control from a vehicle operator;
wherein when the vehicle control unit senses a second overspeed condition, the vehicle control unit activates at least one of the transmission retarder, the engine brake and the service brakes; and
wherein when the vehicle control unit senses a third overspeed condition, the vehicle control unit activates the parasitic load; the third overspeed condition being at a greater speed than the second overspeed condition.

2. The vehicle of claim 1, wherein the parasitic load is a cooling system of the vehicle.

3. The vehicle of claim 2, wherein the cooling system includes a fan motor powered by the powertrain and a fan powered by the fan motor.

4. The vehicle of claim 3, wherein the cooling system is one of an engine cooling system and a secondary cooling system.

5. The vehicle of claim 2, wherein the cooling system is one of a hydraulic cooler and an axle cooler.

6. The vehicle of claim 1, wherein the parasitic load is a drive axle.

7. A method for using vehicle parasitic loads to aid with speed retardation of a vehicle, the method comprising:
monitoring a vehicle using a vehicle control unit to detect overspeed conditions;
taking over throttle control from a vehicle operator by the vehicle control unit when the vehicle control unit senses a first overspeed condition;
activating at least one of transmission retardation, engine brake and service brakes by the vehicle control unit when the vehicle speed exceeds a second overspeed threshold; and
activating a parasitic load by the vehicle control unit to absorb power from the powertrain when the vehicle speed exceeds a third overspeed threshold, the third overspeed threshold being greater than the second overspeed threshold.

8. The method of claim 7, wherein a plurality of parasitic loads are activated when the vehicle speed exceeds the third overspeed threshold.

9. The method of claim 8, further comprising:
for each separate load of the plurality of parasitic loads, monitoring a load temperature associated with the separate load;

when the separate load is activated due to the vehicle speed exceeding a third overspeed threshold, deactivating the separate load when the load temperature associated with the separate load exceeds an overheat temperature threshold associated with the separate load.

10. The method of claim 9, further comprising:
when the separate load is deactivated due to the load temperature associated with the separate load exceeding the overheat temperature threshold while the vehicle speed exceeds the third overspeed threshold, reactivating the separate load when the load temperature associated with the separate load drops below a load activation temperature threshold associated with the separate load while the vehicle speed exceeds the third overspeed threshold.

11. A method for using vehicle parasitic loads to aid with speed retardation of a vehicle, the method comprising:
monitoring a vehicle to detect overspeed conditions;
taking over of throttle control from a vehicle operator by a vehicle control unit when the vehicle speed exceeds a first overspeed threshold;
restoring throttle control to the vehicle operator by the vehicle control unit when the vehicle speed drops below the first overspeed threshold;
activating at least one of transmission retardation, engine brake and service brakes by the vehicle control unit when the vehicle speed exceeds a second overspeed threshold, the second overspeed threshold being greater than the first overspeed threshold;
deactivating any activated ones of the transmission retardation, engine brake and service brakes by the vehicle control unit when the vehicle speed drops below the second overspeed threshold;
activating a parasitic load by the vehicle control unit to absorb power from the powertrain when the vehicle speed exceeds a third overspeed threshold, the third overspeed threshold being greater than the second overspeed threshold; and
deactivating the parasitic load when the vehicle speed drops below the third overspeed threshold.

12. The method of claim 11, further comprising:
monitoring a load temperature associated with the parasitic load;
when the parasitic load is activated due to the vehicle speed exceeding the third overspeed threshold, deactivating the parasitic load when the load temperatures exceeds an overheat temperature threshold; and
when the parasitic load is deactivated due to the load temperatures exceeding the overheat temperature threshold while the vehicle speed exceeds the third overspeed threshold, reactivating the parasitic load when the load temperature drops below a load activation temperature threshold.

13. The method of claim 11, wherein a plurality of parasitic loads are activated when the vehicle speed exceeds the third overspeed threshold, and the plurality of parasitic loads are deactivated when the vehicle speed no longer exceeds the third overspeed threshold.

14. The method of claim 13, further comprising:
for each separate load of the plurality of parasitic loads, monitoring a load temperature associated with the separate load;
when the separate load is activated due to the vehicle speed exceeding the third overspeed threshold, deactivating the separate load when the load temperature associated with the separate load exceeds an overheat temperature threshold associated with the separate load.

15. The method of claim 14, further comprising:
when the separate load is deactivated due to the load temperature associated with the separate load exceeding the overheat temperature threshold while the vehicle speed exceeds the third overspeed threshold, reactivating the separate load when the load temperature associated with the separate load drops below a load activation temperature threshold associated with the separate load.

16. The vehicle of claim 1, further comprising a temperature sensor coupled to the vehicle control unit, the temperature sensor monitoring a load temperature associated with the parasitic load, wherein when the vehicle control unit activates the parasitic load during the third overspeed condition, the vehicle control unit monitors the load temperature using the temperature sensor and deactivates the parasitic load when the monitored load temperature exceeds an overheat threshold.

17. The vehicle of claim 16, wherein when the vehicle control unit deactivates the parasitic load during the second overspeed condition due to the monitored load temperature exceeding an overheat threshold, the vehicle control unit reactivates the parasitic load when the monitored load temperature drops below a load activation temperature threshold during the second overspeed condition.

18. The vehicle of claim 1, wherein when the vehicle control unit senses termination of the third overspeed condition, the vehicle control unit deactivates the parasitic load; the vehicle control unit using different thresholds to sense start of the third overspeed condition and termination of the third overspeed condition.

19. The method of claim 7, further comprising:
monitoring a load temperature associated with the parasitic load;
when the parasitic load is activated due to the vehicle speed exceeding the third overspeed threshold, deactivating the parasitic load when the load temperature exceeds an overheat temperature threshold.

20. The method of claim 19, further comprising:
when the parasitic load is deactivated due to the load temperature exceeding the overheat temperature threshold while the vehicle speed exceeds the third overspeed threshold, reactivating the parasitic load when the load temperatures drops below a load activation temperature threshold while the vehicle speed exceeds the third overspeed threshold.

* * * * *